US011834917B2

(12) United States Patent
Teale

(10) Patent No.: US 11,834,917 B2
(45) Date of Patent: Dec. 5, 2023

(54) DOWNHOLE COLLAR UTILIZING FUSIBLE ANCHOR ELEMENTS

(71) Applicant: WEATHERFORD TECHNOLOGY HOLDINGS, LLC, Houston, TX (US)

(72) Inventor: David W. Teale, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 418 days.

(21) Appl. No.: 17/046,779

(22) PCT Filed: May 11, 2018

(86) PCT No.: PCT/US2018/032185
§ 371 (c)(1),
(2) Date: Oct. 10, 2020

(87) PCT Pub. No.: WO2019/216904
PCT Pub. Date: Nov. 14, 2019

(65) Prior Publication Data
US 2021/0148175 A1 May 20, 2021

(51) Int. Cl.
*E21B 17/10* (2006.01)
*E21B 33/13* (2006.01)
*F16L 13/00* (2006.01)

(52) U.S. Cl.
CPC ...... *E21B 17/1078* (2013.01); *E21B 17/1014* (2013.01); *E21B 33/13* (2013.01); *F16L 13/00* (2013.01)

(58) Field of Classification Search
CPC ... E21B 17/1078; E21B 17/1014; E21B 33/13
See application file for complete search history.

(56) References Cited

U.S. PATENT DOCUMENTS 2,038,867 A * 4/1936 Wilson ............... F16L 37/148
285/321
2,281,632 A 5/1942 Steps
(Continued)

FOREIGN PATENT DOCUMENTS

WO 2002099247 A1 6/2002
WO 02103154 A1 12/2002

OTHER PUBLICATIONS

Int'l Search Report received in copending PCT Application No. PCT/US2018/032185 dated Feb. 19, 2019, 11 pages.
(Continued)

*Primary Examiner* — Robert E Fuller
*Assistant Examiner* — Neel Girish Patel
(74) *Attorney, Agent, or Firm* — Cabello Hall Zinda, PLLC

(57) ABSTRACT

A sleeve can be used as a stop collar on tubing. A fusible element disposed about the inside or outside surface of the collar can be accessed by electrodes via the at least one access point in the collar. An insulator insulates the fusible element from the collar, while the electrodes apply electric current to the fusible element. A fusible material of the fusible element is heated to melting in response to the applied electric current and affixes the collar to the tubing with a metallurgical bond formed from the melting and re-solidifying of the fusible material inside a space between the first circumferential surface of the collar and the opposing circumferential surface of the tubing. The fusible material can be heated to melting directly with the electric current, or an ignitable material activated with the electric current can melt the fusible material.

20 Claims, 7 Drawing Sheets

(56) References Cited

U.S. PATENT DOCUMENTS

| | | | |
|---|---|---|---|
| 2,301,495 A | | 11/1942 | Abegg |
| 2,388,416 A | | 11/1945 | Johnson |
| 2,877,062 A | | 3/1959 | Hall et al. |
| 3,124,196 A | * | 3/1964 | Solum ................. E21B 17/1028 166/241.6 |
| 3,360,846 A | | 1/1968 | Schellstede et al. |
| 3,499,210 A | | 3/1970 | Schellstede et al. |
| 3,578,084 A | * | 5/1971 | Bombardieri ....... E21B 17/1028 166/241.6 |
| 3,868,131 A | * | 2/1975 | Zondag ................ B21D 39/066 228/2.5 |
| 3,948,434 A | * | 4/1976 | Rothchild ........... B29C 66/1162 228/234.3 |
| 4,088,186 A | * | 5/1978 | Callihan ............. E21B 17/1028 166/173 |
| 4,436,158 A | * | 3/1984 | Carstensen ............. E21B 10/30 166/61 |
| 4,445,727 A | | 5/1984 | Funk |
| 4,688,636 A | | 8/1987 | Hennessey |
| 5,176,410 A | * | 1/1993 | Beyer ..................... F16L 13/08 228/56.3 |
| 6,533,034 B1 | | 3/2003 | Barger |
| 2003/0000607 A1 | * | 1/2003 | Jenner ................. E21B 17/1028 29/896.9 |
| 2006/0037749 A1 | * | 2/2006 | Wardlaw ................. E21B 29/10 166/302 |
| 2007/0284037 A1 | | 12/2007 | Buytaert |
| 2013/0160993 A1 | | 6/2013 | Davila et al. |
| 2015/0047855 A1 | | 2/2015 | Buytaert et al. |
| 2015/0101813 A1 | | 4/2015 | Zhao et al. |
| 2016/0273277 A1 | | 9/2016 | Jewett |
| 2017/0009536 A1 | | 1/2017 | Kiess et al. |
| 2021/0071808 A1 | * | 3/2021 | Toguyeni ............ E21B 17/1028 166/241.6 |

OTHER PUBLICATIONS

Wellcare, "Primary Cementing Products Centralizers & Stop Collars," Drilling & Down-hole Completion Tools brochure, 19 pages.

Mike Moffitt, SPE, "System Adds Reliability, Efficiency to Attaching Well Construction and Completion Tools," Ace Oil Tools article https://www.spe.org/en/print-article/?art=3058 dated Jul. 1, 2017, 4 pages.

Forum Energy Technologies, "Cementing & Casing Accessories," Davis-Lynch Equipment Catalog No. 21, 36 pages.

Halliburton, "Close Tolerance Pres Fit Stop Collar (SP-21PF Series)," Cementing brochure, 2012, 2 pages.

* cited by examiner

DOWNHOLE COLLAR UTILIZING FUSIBLE ANCHOR ELEMENTS

BACKGROUND OF THE DISCLOSURE

Stop collars are traditionally used to anchor accessories to casing or tubing strings in a downhole assembly or to provide a referenced stop position for a drillstring to achieve a specified position within a wellbore. A stop collar needs to provide a sufficient load capacity, but the collar is preferably easy to assemble on the tubing. The stop collar is typically assembled at a wellsite or in a pipe yard depending on the size of the tubing and the application in which it is used.

As one example shown in FIG. 1, stop collars 30A-B may be attached on tubing 20 to provide stops for a centralizer 40 for the tubing 20 disposed in a borehole 10. Because the centralizer 40 may include bow springs 44 between end rings 42, the stop collars 30A-B are spaced out from the end rings 42 to allow for the flexing and movement of the centralizer 40 while keeping the centralizer 40 contained on the tubing string 20. Here, the stop collars 30A-B are affixed to the tubing string 20 with set screws 32, requiring a significant amount of manual labor to attach the collars 30A-B in place on the tubing sting 20.

Tubulars used for the downhole tubing string 20 may have acceptable variations in their outer diameters. Therefore, a given stop collar 30A-B for use with one particular sized tubular must be able to accommodate the variations in diameter. As noted above, stop collars 30A-B are traditionally fixed to the tubing by using set screws 32. Other mechanical fixtures can be used, such as latch mechanism, clamp, friction lock, and epoxy. Configurations for the stop collars 30A-B can include a slip-on style solid sleeve, clam shell/hinged sleeves, and a hose clamp-style configuration.

Operators are continually seeking to reduce the time required to assemble components, such as such stop collars. Existing stop collars require labor intensive assembly and may not even meet the load capacity requirements of today's downhole applications.

The subject matter of the present disclosure is directed to overcoming, or at least reducing the effects of, one or more of the problems set forth above.

SUMMARY OF THE DISCLOSURE

A method is disclosed of attaching a collar to tubing for use downhole. The method comprises not necessarily in sequence: positioning a fusible element about a first circumferential surface of the collar; insulating the fusible element from a first material of the collar; positioning the collar with the first circumferential surface adjacent an opposing circumferential surface of the tubing; heating a fusible material of the fusible element to melting by accessing the fusible element through at least one access point defined through a second circumferential surface of the collar; and affixing the collar to the tubing with a metallurgical bond formed from the melting and re-solidifying of the fusible material between the first circumferential surface of the collar and the opposing circumferential surface of the tubing.

To position the fusible element about the first circumferential surface of the collar, the fusible element can be positioned about an inside surface of the collar, and the inside surface of the collar can be positioned about an outside surface of the tubing. Alternatively, the fusible element can be positioned about an outside surface of the collar, and the outside surface of the collar can be positioned about an inside surface of the tubing.

To position the collar with the first circumferential surface adjacent the opposing circumferential surface of the tubing, the collar can slide longitudinally onto or into the tubing, or the collar can be opened and closed laterally onto the tubing.

To heat the fusible material of the fusible element to melting, electric current can be applied to the fusible element. For example, the current can be applied with electrodes through the at least one access point. The applied electric current can heat the fusible material to melting. Alternatively, the fusible material can be heated to melting by igniting an ignitable material of the fusible element with the applied electric current. In another alternative to heat the fusible material of the fusible element to melting, an ignitable element adjacent the fusible element can be ignited. For example, electric current can be applied to the ignitable element with electrodes. The fusible element can be positioned in a groove defined about the first circumferential surface. The fusible element can be insulated from the first material of the collar by positioning a wire of the fusible element in an insulator of the fusible element; positioning a plug of the fusible element in an insulator of the fusible element; or insulating a wire of the fusible element with an insulator jacket of the fusible element.

As disclosed herein, an apparatus for use on tubing comprises: a collar having first and second circumferential surfaces, the collar disposed with the first circumferential surface adjacent an opposing circumferential surface of the tubing, the collar having at least one access point defined through the first and second circumferential surfaces; a fusible element disposed about the first circumferential surface of the collar and accessible via the at least one access point in the collar; an insulator insulating the fusible element from the collar; and a fusible material of the fusible element heated to melting in response to electric activation and affixing the collar to the tubing with a metallurgical bond formed from the melting and re-solidifying of the fusible material inside a space between the first circumferential surface of the collar and the opposing circumferential surface of the tubing.

The apparatus can further comprise a centralizer disposed on the tubing adjacent the collar. The collar can comprise an end ring of a centralizer disposed on the tubing.

The first circumferential surface of the collar can an inside surface of the collar, and the second circumferential surface can be an outside surface of the collar. Alternatively, a reverse arrangement can be used.

The fusible element can comprise an ignitable material disposed with the fusible material, where the ignitable material is ignited with the electric activation and melting the fusible material to form the metallurgical bond. The ignitable material can comprise a thermite, a metal-oxidizer, a metal hydride-oxidizer, an intermetallic, or a pyrotechnic composition. The fusible element can comprise an electropyrotechnic initiator, a bridge wire, a nichrome wire, or a heating element.

The fusible element can comprise a composite of the ignitable material and the fusible material. Alternatively, the fusible element can comprise a core of the fusible element, and the fusible material can be disposed as a jacket of the fusible element about the core.

The fusible material can comprise a metallic weld material, a metallic braze material, a metallic solder material, a metallic alloy, or a metallurgical bonding material.

The fusible element can comprise a wire of the fusible material having a jacket disposed thereabout. The jacket can comprise a flux material or the insulator.

The apparatus can further comprises a tool having electrodes coupled to a source of electric current. The electrodes are engageable with the fusible element via the at least one access point to apply the electric current to the fusible element as the electric activation.

The foregoing summary is not intended to summarize each potential embodiment or every aspect of the present disclosure.

DETAILED DESCRIPTION OF THE DISCLOSURE

Figure 2B:
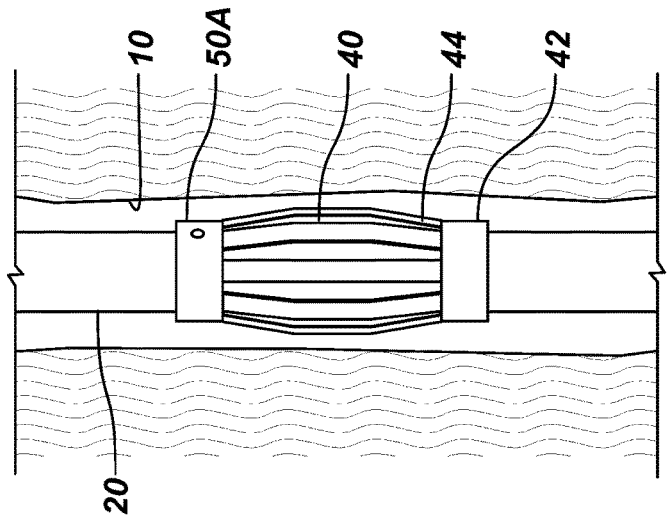
FIG. 2B illustrates a centralizer with an end ring affixed to the tubing string according to the present disclosure.
Figure 2A:
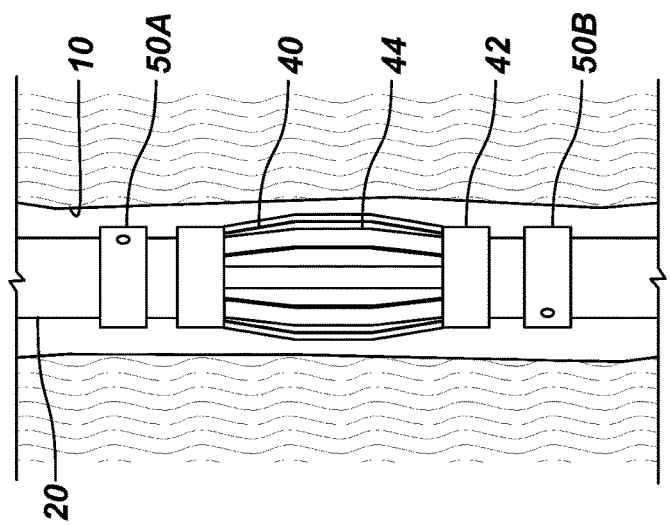
FIG. 2A illustrates stop collars according to the present disclosure affixed on a tubing string to contain a centralizer.
Figure 1:
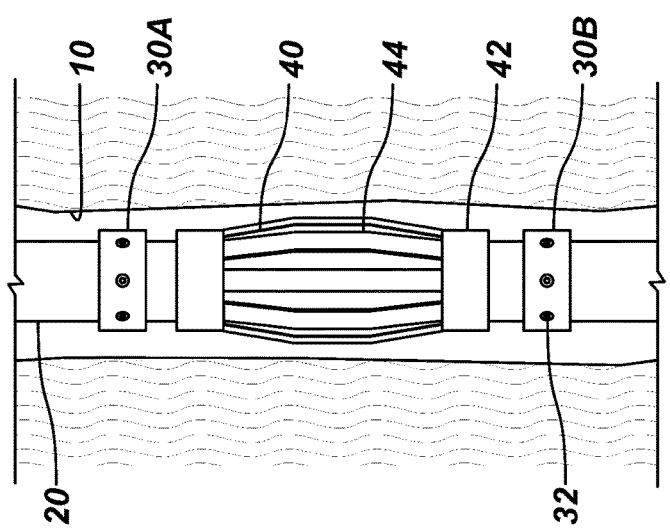
FIG. 1 illustrates stop collars according to the prior art affixed on a tubing string to contain a centralizer.

FIG. 2A illustrates stop collars 50A-B according to the present disclosure affixed on tubing 20 to contain a centralizer 40 for the tubing 20 disposed in a borehole 10. Because the centralizer 40 may include bow springs 44 between end rings 42, the stop collars 50A-B can spaced out from the end rings 42 to allow for flexing and movement of the centralizer 40 while keeping the centralizer 40 contained on the tubing 20. As a variation, FIG. 2B illustrates a centralizer 40 with one of its end rings affixed as a stop collar 50A to the tubing 20 according to the present disclosure. The other end ring 42 may not be fixed.

Figure 3A:
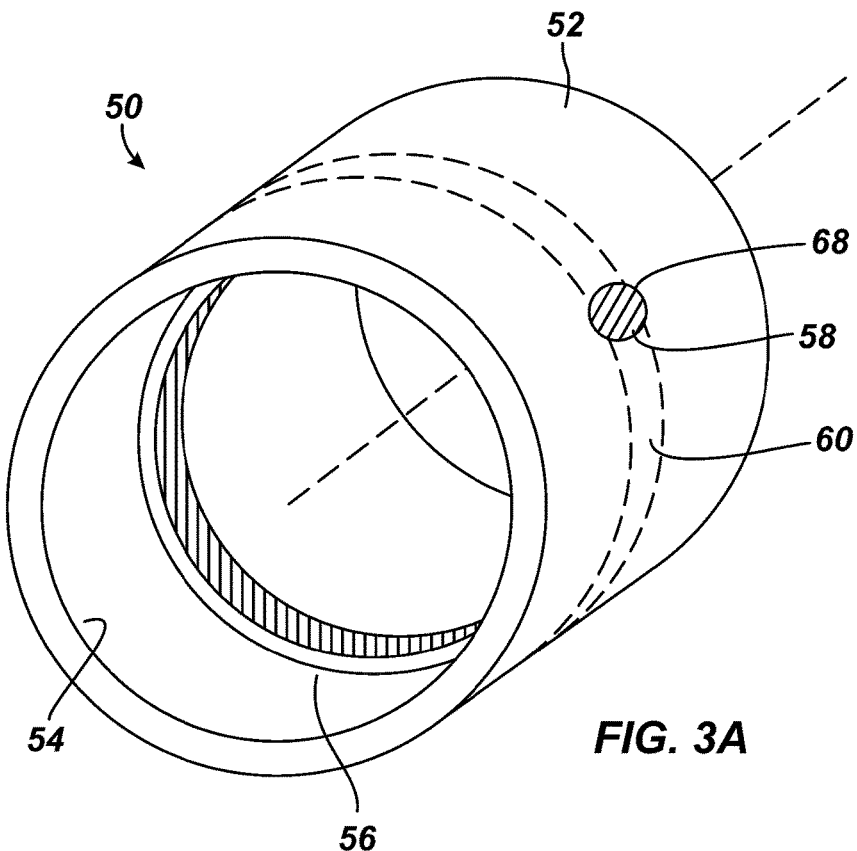
FIG. 3A illustrates a perspective view of an external sleeve according to the present disclosure for a collar or end ring to affix outside a tubing string.

Rather than be held only mechanically, the stop collars 50A-B are affixed to the tubing 20 with a metallurgical bond provided by an internal fusible element disposed inside the collar 50A-B. For example, FIG. 3A illustrates a perspective view of an external sleeve 50 according to the present disclosure for use as a stop collar or an end ring to affix outside tubing.

The external sleeve 50 can be a unity cylindrical component as shown, or it can comprises a number of separate, hinged, or interconnectable segments. The external sleeve 50 includes a fusible element 60 disposed around the inner circumference of the sleeve's bore 54 to bond the sleeve 50 to the outside of tubing using a portable power supply or other electric activation source. The sleeve 50 can have any desired configuration (e.g., length, thickness, material, etc.). The fusible element 60 can be disposed about the entire inner circumference, or one or more sections of the element 60 can be disposed about one or more portions of the inner circumference.

The fusible element 60 includes a fusible material disposed in an internal groove 56 inside the central bore 54 of the sleeve 50. One or more access points 58 are defined through the outside surface 52 of the sleeve 50 for access to an exposed portion 68 of the fusible element 60. The access allows the fusible element 60 to be electrically activated— e.g., hit with electric current, ignited, melted, or otherwise activated, to attach the sleeve 50 to the tubing on which it is disposed. Once activated and as noted below, the attachment provided by the fusible element 60 is a metallurgical bond between sleeve 50 and the tubing. The bonding can be accomplished by melting the fusible material (e.g., a weld material or a braze material) of the fusible element 60 with the electrical current, the ignition source, or the like. The assembly process is of a short duration and requires no mechanical assembly.

Figure 3B:
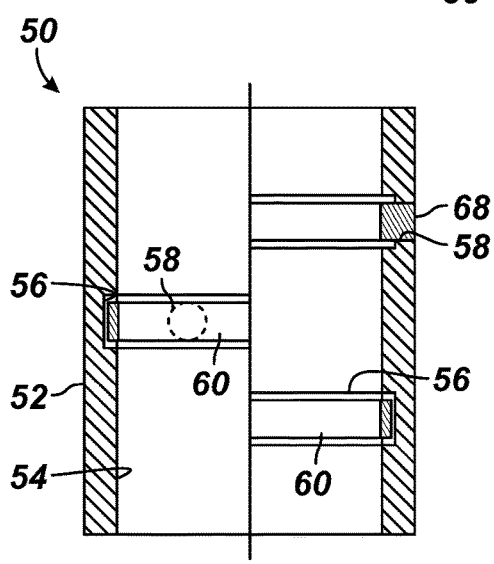
FIG. 3B illustrates a divided cross-sectional view of an external sleeve according to the present disclosure.

As shown in FIG. 3B, a given sleeve 50 may have one fusible element 60 (left side of FIG. 3B) or may have more than one fusible element 60 (right side of FIG. 3B). The fusible element(s) 60 can disposed in respective grooves 56 in the inner bore 54 and can be accessed by one or more external access points 58.

Figure 3C:
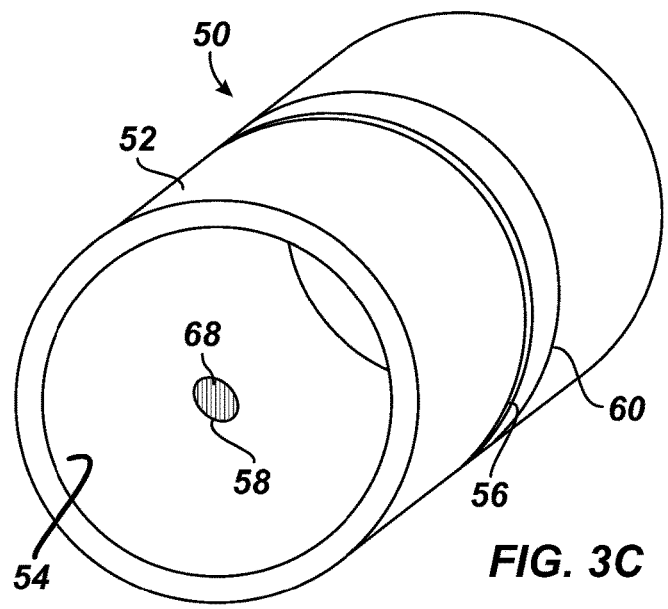
FIG. 3C illustrates a perspective view of an internal sleeve according to the present disclosure for a collar or end ring to affix inside a tubing string.

As opposed to being external, an internal sleeve 50 as shown in FIG. 3C can be used for a collar, shoulder, or the like to affix inside a tubing string. The internal sleeve 50 can be a unity cylindrical component as shown, or it can comprises a number of separate, hinged, or interconnectable segments. The internal sleeve 50 includes the fusible element 60 disposed around the outer circumference of the sleeve's outer surface 52 to bond the sleeve 50 to the inside of tubing using a portable power supply or other activation source. Again, the sleeve 50 can have any desired configuration (e.g., length, thickness, material, etc.). The fusible element 60 can be disposed about the entire outer circumference, or one or more sections of the element 60 can be disposed about one or more portions of the outer circumference.

The fusible element 60 can include fusible material disposed in an external groove 56 defined about the sleeve 50. One or more access points 58 are defined in the bore 54 of the sleeve 50 for access to ignite, melt, or otherwise activate the fusible element 60 at an exposed portion 68 of the element 60. The access allows the fusible element 60 to be hit with current, ignited, melted, or otherwise activated to attach the sleeve 50 to the tubing in which it is disposed. Once activated and as noted below, the attachment provided by the fusible element 60 is a metallurgical bond between sleeve 50 and the tubing. The bonding can be accomplished by melting the fusible material—e.g., a weld material or a braze material, of the fusible element 60 with the electrical current, ignition source, or the like. The assembly process is of a short duration and requires no mechanical assembly.

The fusible element 60 can have a number of configurations that allow a fusible material to melt in response to electric activation. In one arrangement shown in FIGS. 4A-4B, the fusible element 60 includes a wire 64 disposed in a groove of an insulator 62 defined in the sidewall groove 56 of the sleeve 60, which can be internal or external for the purposes of the present discussion.

Figure 4A:
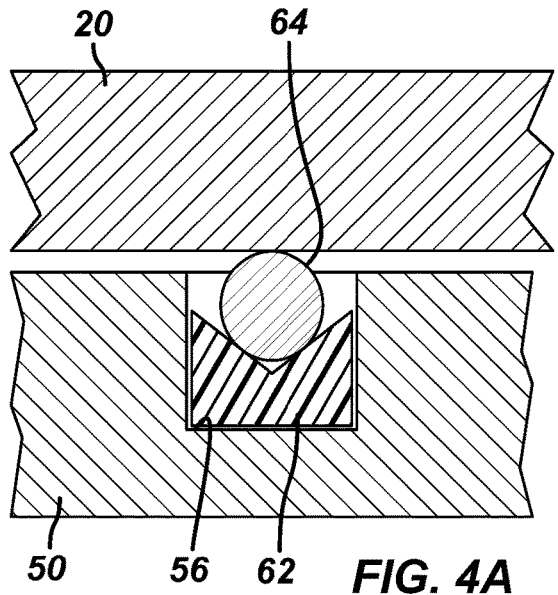
FIGS. 4A-4B illustrate cross-sectional views of portion of a sleeve of the present disclosure having one embodiment of fusible element.
Figure 4B:
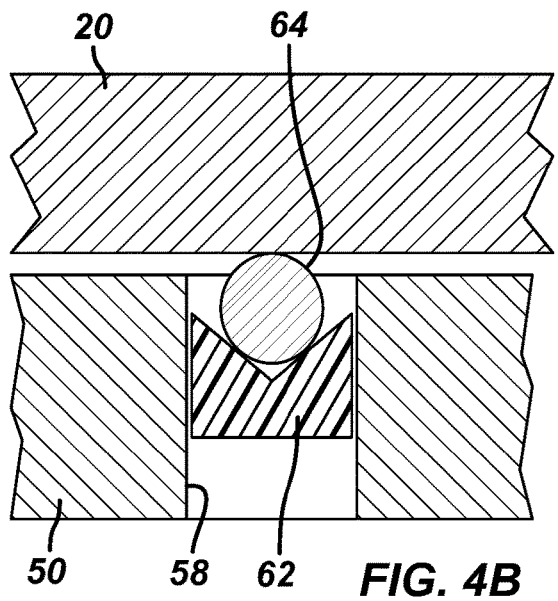

As shown in FIG. 4A, the groove 56 in the sidewall of the sleeve 50 is oriented toward the tubing 20, and the insulator 62 holds the wire 64 exposed outward from the groove 56 toward the tubing 20 while insulating the wire 64 from the metal of the sleeve 50. As shown in FIG. 4B, the access point 58 in the sidewall of the sleeve 50 allows for access to the wire 64, which can be reached through an opening in the insulator 62 or through a node (not shown) of the wire 64 exposed in the insulator 62.

Figure 4C:
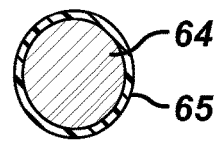
FIG. 4C illustrates an end-section of a wire for the fusible element.

The sleeve 50 of the stop collar can be constructed of traditional metals or can be made with a composite material (insulator). Fusing of the sleeve 50 to the tubing 20 can be accomplished directly with electric current melting the fusible element 60. As shown in FIG. 4C, the wire 64 can be composed of a metallic weld material, a metallic braze material, a metallic solder material, a metallic alloy, or a metallurgical bonding material. The wire 64 can include an insulator jacket 65 disposed about the wire 64. Alternatively, the wire 64 can include a jacket 65 of flux. Activation is made by an electrical supply, and the electric current generates enough heat to liquefy the fusible material of the wire 64 so it can re-solidify and fuse between the sleeve 50 and the tubing 20 with a metallurgical bond. The jacket 65 of flux or the like can facilitate the metallurgical bond produced. Fusing can also be accomplished with a controlled chemical reaction of an ignitable material in the fusible element 60. For example, a core 64 as shown in FIG. 4C can be constructed of ignitable material surrounded by a jacket 65 of fusible material (weld or braze material). Ignition is made by an electrical supply, and a chemical reaction from the ignition generates enough heat to liquefy the fusible material of the jacket 65 to fuse the sleeve 50 to the tubing 20 with a metallurgical bond. The ignitable material can be a thermite, a metal-oxidizer, a metal hydride-oxidizer, an intermetallic, or a pyrotechnic composition. To ignite the ignitable material, the fusible element can include an electro-pyrotechnic initiator, a bridge wire, a nichrome wire, a heating element, or the like.

Figure 5A:
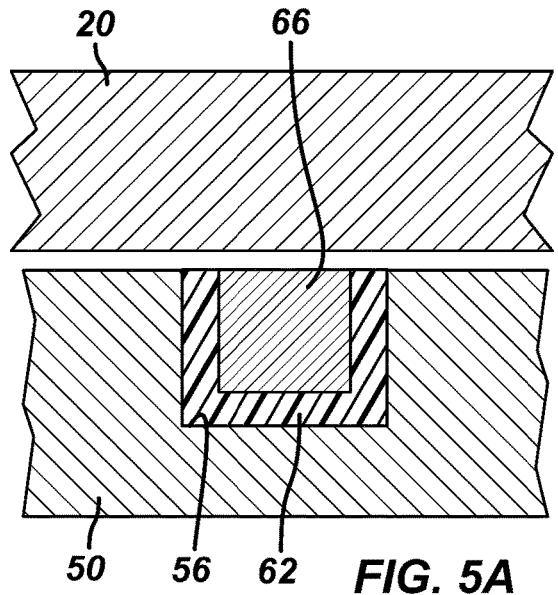
FIGS. 5A-5B illustrates cross-sectional views of portion of a sleeve of the present disclosure having another embodiment of fusible element.
Figure 5B:
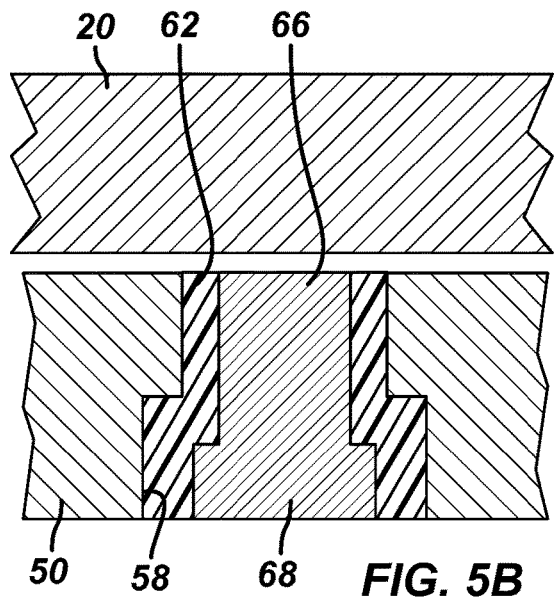

In another arrangement shown in FIGS. 5A-5B, the fusible element 60 includes a plug 66 disposed in an insulator 62 defined in the sidewall groove 56 of the sleeve 50, which can be internal or external for the purposes of the present discussion. The plug 66 can be composed of fusible material, such as a weld or braze material, or can be composed of composite of fusible material and ignitable material.

As shown in FIG. 5A, the groove 56 in the sidewall of the sleeve 50 is oriented toward the tubing 20, and the insulator 62 holds the plug 66 exposed outward from the groove 56 toward the tubing 20 while insulating the plug 66 from the metal of the sleeve 50. As shown in FIG. 5B, the access point 58 in the sidewall of the sleeve allows for access to an exposed portion 68 of the plug 66, which can be reached through an opening in the insulator 62 or through a node (not shown) in the insulator 62.

Although shown in the form of wire or core 64 and a plug 66, the fusible element 60 can be configured generally as a plug, a wire, a sheet, a strip, or other appropriate shape. The fusible material of the element 60 can be coated with an insulating material that serves as a flux agent for better bonding between surfaces. The fusible material of the element 60 can be mixed in a composite with an ignitable material, such as thermite, or can surround or be surrounded by such an ignitable material.

Figure 6A:
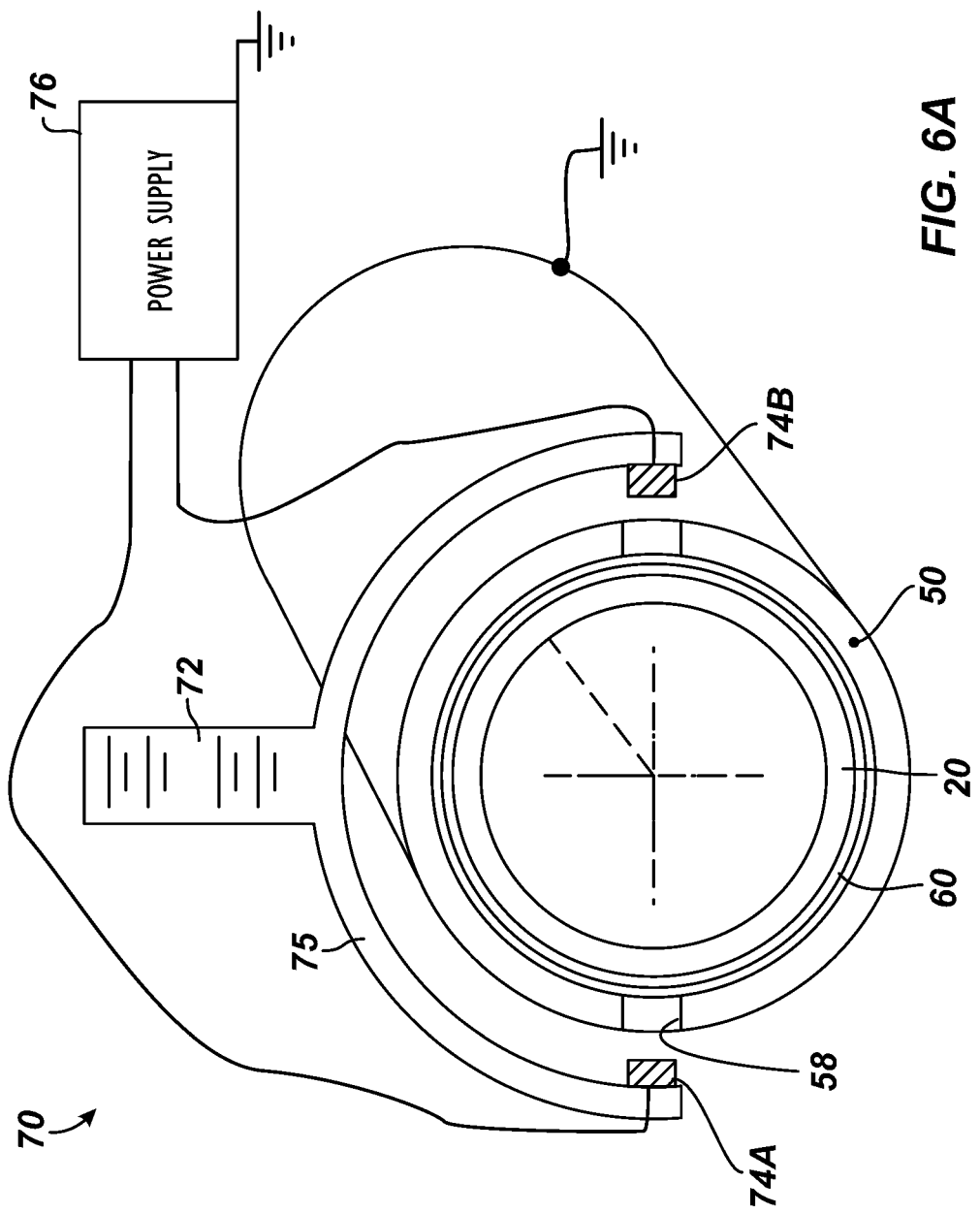
FIG. 6A illustrates a tool fusing an external sleeve to tubing according to the present disclosure.

FIG. 6A illustrates a tool 70 for fusing a sleeve 50 to tubing 20 according to the present disclosure. The tool 70 includes a handle or manipulator 72 with opposing electrodes 74A-B on arms 75. The electrodes 74A-B connect to a power supply 76, which provides a current spike to initiate the fusing of the fusible element 60 to the tubing 20. The electrodes 74A-B on the arms 75 can be brought into connect with the fusible element 60 through the access points 58.

Figure 7:
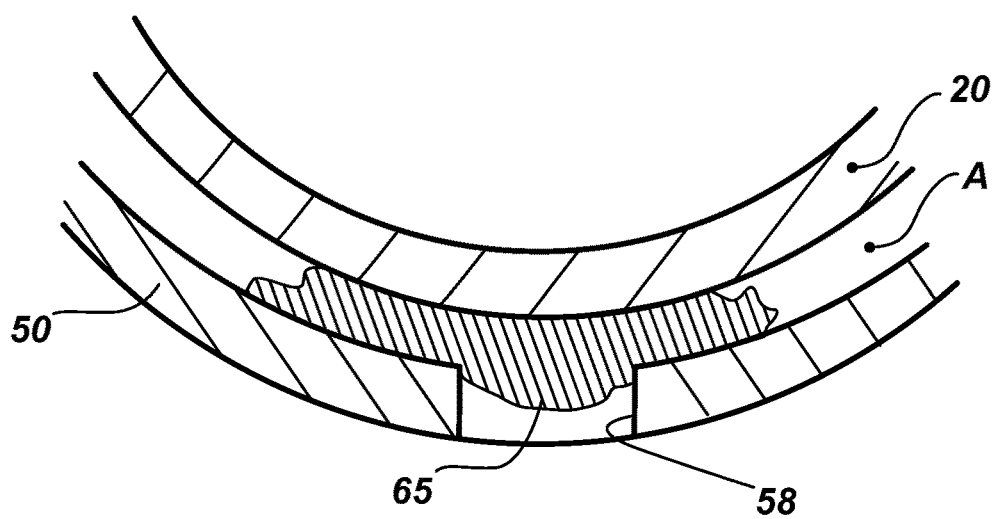
FIG. 7 illustrates a detailed, sectional view of the external sleeve fused to the tubing.

As shown in FIG. 6A, the sleeve 50 of the collar can be slipped onto the tubing 20. The installation tool 70 having a handle 72 is positioned about the sleeve 50 with electrical contacts 74A-B of the tool 70 contacting the fusible element 60 at the access ports 58 in the sleeve 50. The tubing 20 may be grounded as an option. The power supply 76 provides the energy to melt/ignite the fusible element 60 and form a solid bond between the inside of the sleeve 50 and the outside of the tubing 20. As shown in FIG. 7, for example, the electrical contact inserted in the access point 58 applies current to the fusible element 60, which then fills the gap A between the sleeve 50 and tubing 20 to form a solid bond.

Figure 6B:
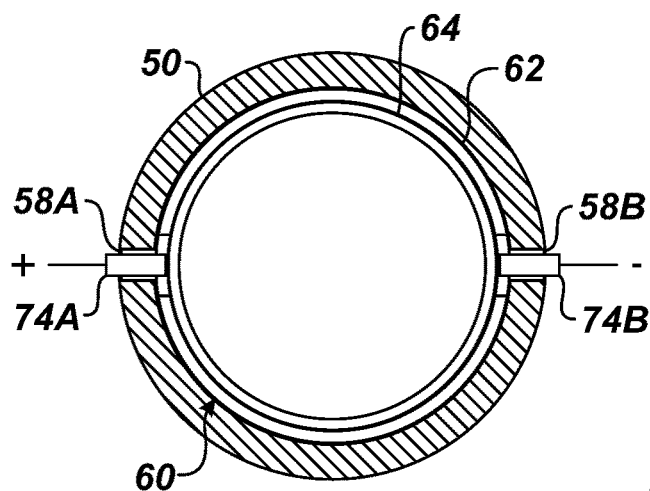
FIGS. 6B-6C illustrate example arrangements of electrodes for the activation tool of FIG. 6A to engage a fusible element of a sleeve.

A number of arrangements of electrodes 74A-B can be used. For example, FIG. 6B shows opposing electrodes 74A-B positioning in opposing access points 58A-B to make electric contact with the wire 64 (or other feature) of the fusible element 60 insulated from the sleeve 50 by the insulator 62. A voltage differential between the electrodes 74A-B permit a spike in current to flow through the wire 64 to activate the fusing process.

Figure 6C:
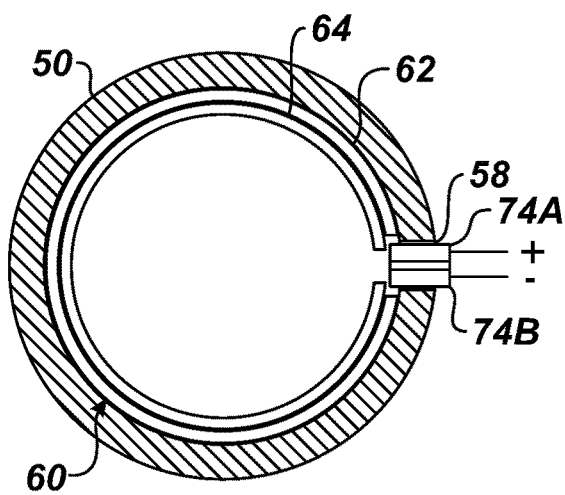

In another example, FIG. 6C shows adjacent electrodes 74A-B positioning in a common access point 58 to make electric contact with ends of the wire 64 (or other feature) of the fusible element 60 insulated from the sleeve 50 by the insulator 62. A voltage differential between the electrodes 74A-B permit a spike in current to flow through the wire 64 to activate the fusing process.

Although the arrangement in FIGS. 6A-6C is for externally fusing a sleeve 50 to tubing, it will be appreciated that the components can be reversed in arrangement for internally fusing a sleeve 50 inside tubing.

FIG. 7 illustrates a detailed, sectional view of the sleeve 50 fused to the tubing 20. The fusible material 65 of the element fuses the surfaces of the sleeve 50 and tubing 20 together and at least partially fills the annular space A. More or less fusing may be achieved depending on the fusible material, the desired load capacity, and other factors. In general, the load capacity of the sleeve 50 is based on the shear strength of the metallurgical bond of the fused material and does not rely exclusively on a mechanical friction hold by various elements as in conventional configurations. However, the sleeve 50 can further include a mechanical friction hold through additional means (e.g., set screw, clamp, etc.) in addition to the metallurgical bond disclosed herein.

Figure 8A:
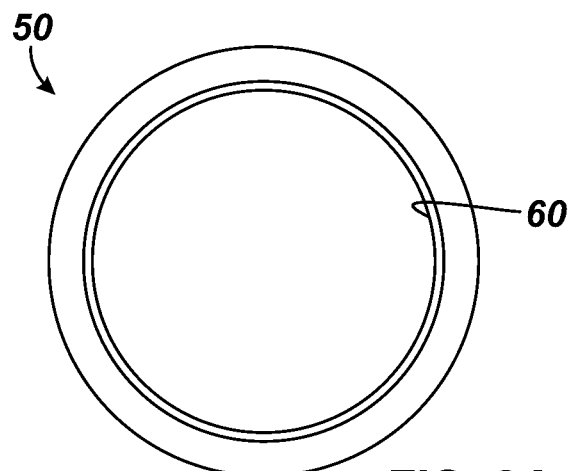
FIGS. 8A-8C illustrate end views of various stop collars according to the present disclosure.
Figure 8B:
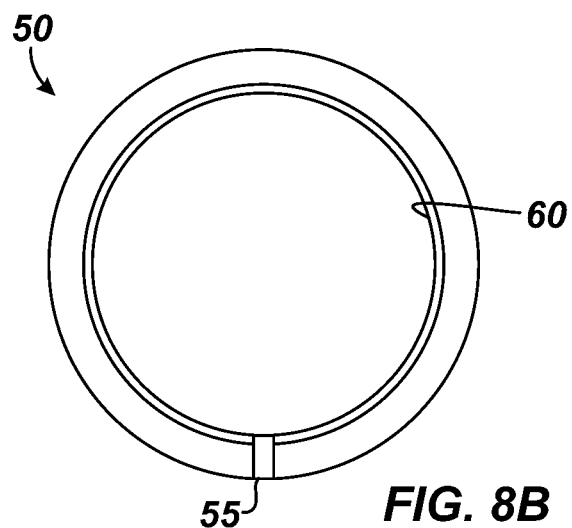

As noted previously and as shown again in FIG. 8A, the sleeve 50 can be a unitary cylinder that slips on (or into) tubing to which the sleeve 50 is to be attached with the fusible element 60. Other configurations can be used. For example, FIG. 8B illustrates the sleeve 50 with a longitudinal split 55 that allows the sleeve 50 to be opened and closed about tubing to which the sleeve 50 is to be attached with the fusible element 60. Depending of the flexibility of the materials for the sleeve 50 and the fusible element 60, the split may be larger or smaller to accommodate the tubing size.

Figure 8C:
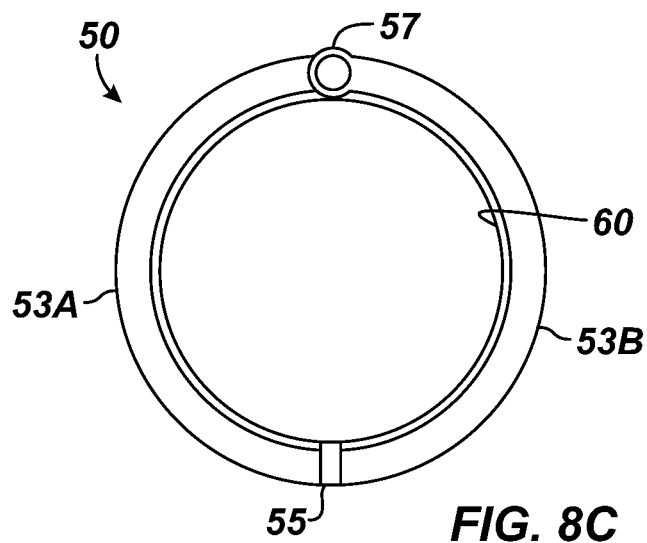

In another example, FIG. 8C illustrates the sleeve 50 with at least two segments 53A-B connected by one or more hinges 57 that allows the sleeve 50 to be opened and closed about tubing to which the sleeve 50 is to be attached with the fusible element 60. More hinges 57 and segments 53 can be used if desired. It is also conceivable that separate segments 53 (lacking hinges or other interconnection) can be separately affixed to the tubing with fusible elements 60 to produce a stop, a collar, or a sleeve as desired.

Figure 9:
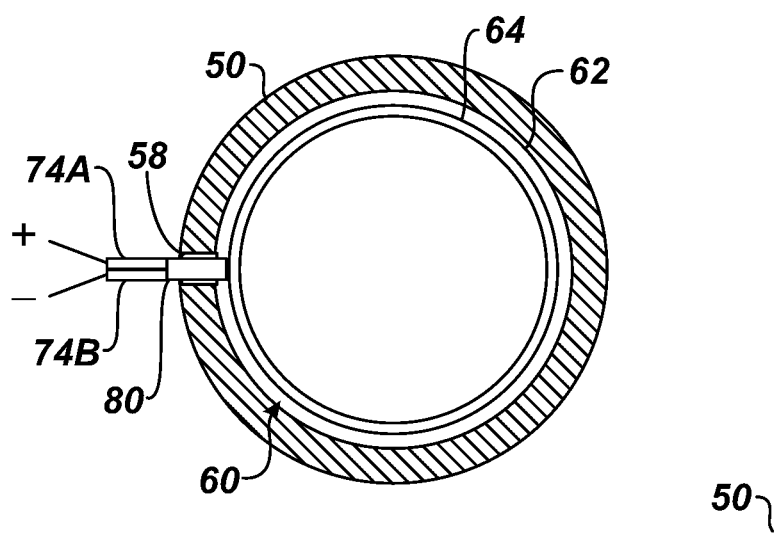
FIG. 9 illustrates an alternative arrangement for initiating the affixing of a stop collar on tubing.

FIG. 9 illustrates an alternative arrangement for initiating the affixing of a stop collar on tubing. A sleeve 50 of the stop collar includes an access point 58 having an ignitable element 80 disposed adjacent the fusible element 60. Electrodes 74A-B of a tool (not shown) can be positioned against the ignitable element 80, which is ignited in response to the electric current. The heat from the ignition then activates the fusible element 60 to affix the sleeve 50 to the tubing (not shown). Multiple access points 58 and ignitable elements 80 can be provided on the sleeve 50 for the fusible element 60.

Figure 10A:
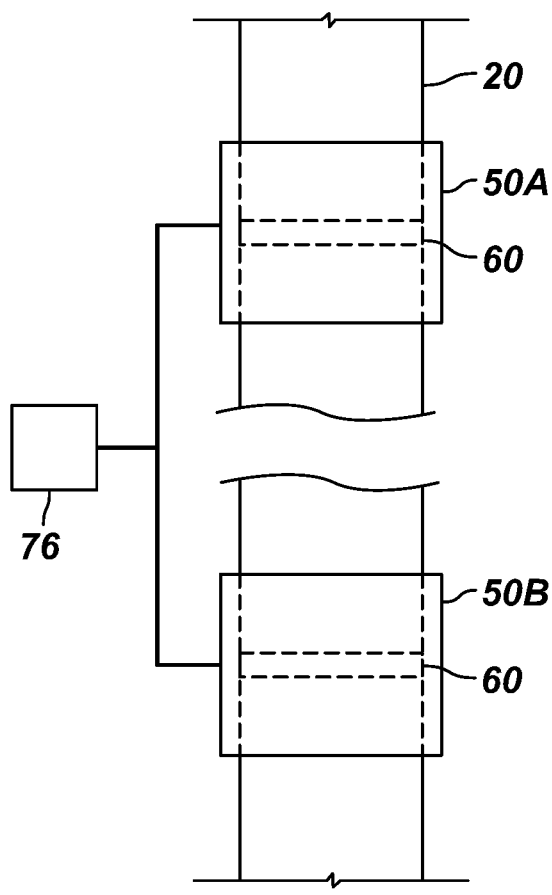
FIGS. 10A-10B illustrate arrangements for affixing multiple stop collars on tubing.
Figure 10B:
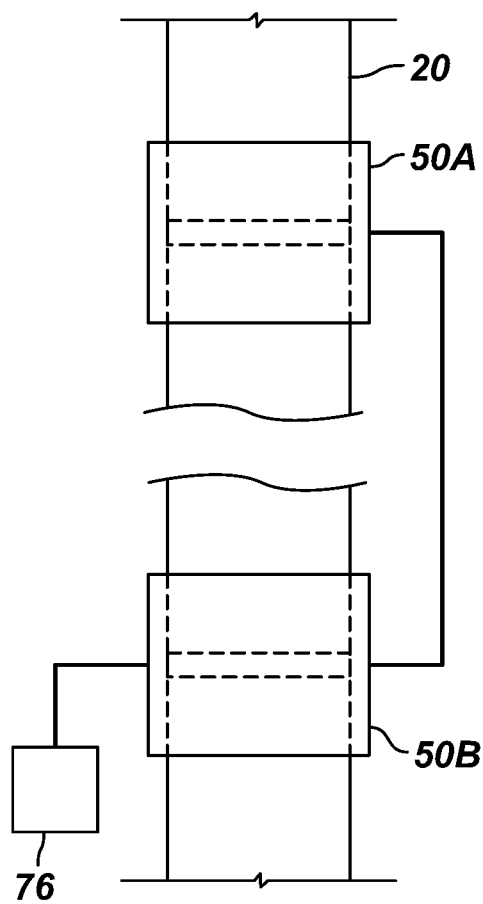

More than one stop collar can be affixed at a time on tubing. For example, FIGS. 10A-10B illustrate arrangements for affixing the sleeves 50A-B of multiple stop collars on the same tubing 20. In FIG. 10A, an electric source 76 associated with a tool (not shown) connects in parallel to the fusible elements 60 of two or more stop collar sleeves 50A-B. Activation can then fuse the two stop collar sleeves 50A-B on the tubing 20 at the same time. In FIG. 10B, the electric source 76 associated with a tool (not shown) connects in series to the fusible elements 60 of two or more stop collar sleeves 50. Activation can then fuse the two stop collar sleeves 50A-B on the tubing 20 in sequence.

The disclosed sleeve 50, fusible element 60, and the tool 70 require only a short setup time for operators to prepare tubing with stop collars. The equipment is portable, and the fusing process is instantaneous. As opposed to the typical mechanical configurations for installing stop collars, the disclosed assembly does not require assembling together a number of loose components, tightening set screws, etc., although it may be supplemented with mechanical fixing.

The process is self-contained and controlled. Operator can tag the target collar with the electrodes so the applied current fuses the material. The process also allows for the use of composites and alternate materials. This represents an additional cost savings since the collars can be transformed from a machined or cast component to a molded, high-production component.

The foregoing description of preferred and other embodiments is not intended to limit or restrict the scope or applicability of the inventive concepts conceived of by the Applicants. For example, although the sleeve 50 may have been disclosed herein for use as a stop collar or an end ring, the sleeve 50 can be used for other purposes on the outside or on the inside of tubing. For example, the sleeve 50 can be used for a stabilizer for affixing on the outside of tubing. The sleeve 50 can be used for a landing collar disposed on the inside of tubing against with a running tool or the like can land.

It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A method of attaching a collar to tubing for use downhole, the method comprising not necessarily in sequence:
   positioning a fusible element about a first circumferential surface of the collar;
   insulating the fusible element from a first material of the collar by insulating a wire of the fusible element with an insulator jacket of the fusible element, wherein the insulator jacket comprises a flux material;
   positioning the collar with the first circumferential surface adjacent an opposing circumferential surface of the tubing;
   heating a fusible material of the fusible element to melting by accessing the fusible element through at least one access point defined through a second circumferential surface of the collar; and
   affixing the collar to the tubing with a metallurgical bond formed from the melting and re-solidifying of the fusible material between the first circumferential surface of the collar and the opposing circumferential surface of the tubing.

2. The method of claim 1, wherein:
   positioning the fusible element about the first circumferential surface of the collar comprises positioning the fusible element about an inside surface of the collar, and positioning the collar with the first circumferential surface adjacent the opposing circumferential surface of the tubing comprises positioning the inside surface of the collar about an outside surface of the tubing; or
   positioning the fusible element about the first circumferential surface of the collar comprises positioning the fusible element about an outside surface of the collar, and positioning the collar with the first circumferential surface adjacent the opposing circumferential surface of the tubing comprises positioning the outside surface of the collar about an inside surface of the tubing.

3. The method of claim 1, wherein:
   positioning the collar with the first circumferential surface adjacent the opposing circumferential surface of the tubing comprises sliding the collar longitudinally onto or into the tubing; or
   positioning the collar with the first circumferential surface adjacent the opposing circumferential surface of the tubing comprises opening and closing the collar laterally onto the tubing.

4. The method of claim 1, wherein heating the fusible material of the fusible element to melting comprises applying electric current to the fusible element.

5. The method of claim 4, wherein heating the fusible material of the fusible element to melting comprises igniting an ignitable material of the fusible element with the applied electric current.

6. The method of claim 1, wherein heating the fusible material of the fusible element to melting comprises igniting an ignitable element adjacent the fusible element.

7. The method of claim 6, wherein igniting the ignitable element adjacent the fusible element comprises applying electric current to the ignitable element.

8. The method of claim 1, wherein positioning the fusible element about the first circumferential surface of the collar comprises positioning the fusible element in a groove defined about the first circumferential surface.

9. The method of claim 1, wherein positioning the collar with the first circumferential surface adjacent the opposing circumferential surface of the tubing comprises:
   sliding a cylindrical sleeve of the collar onto or into the tubing;
   wrapping a split sleeve having a longitudinal split therein about the tubing; or
   closing a hinged sleeve having a longitudinal split and at least one hinge about the tubing.

10. An apparatus for use on tubing, the apparatus comprising:
   a collar having first and second circumferential surfaces, the collar disposed with the first circumferential surface adjacent an opposing circumferential surface of the tubing, the collar having at least one access point defined through the first and second circumferential surfaces;
   a fusible element disposed about the first circumferential surface of the collar and accessible via the at least one access point in the collar;
   an insulator insulating the fusible element from the collar; and
   a fusible material of the fusible element heated to melting in response to electric activation and affixing the collar to the tubing with a metallurgical bond formed from the melting and re-solidifying of the fusible material inside a space between the first circumferential surface of the collar and the opposing circumferential surface of the tubing, wherein the fusible element comprises a wire insulated in a jacket of the insulator, wherein the jacket comprises a flux material.

11. The apparatus of claim 10, further comprising a centralizer disposed on the tubing adjacent the collar.

12. The apparatus of claim 10, wherein the collar comprises an end ring of a centralizer disposed on the tubing.

13. The apparatus of claim 10,
   wherein the first circumferential surface is an inside surface of the collar, and the second circumferential surface is an outside surface of the collar; or
   wherein the first circumferential surface is an outside surface of the collar, and the second circumferential surface is an inside surface of the collar.

14. The apparatus of claim 10, wherein the fusible element comprises an ignitable material disposed with the fusible material, the ignitable material being ignited with the electric activation and melting the fusible material to form the metallurgical bond.

15. The apparatus of claim 14, wherein the ignitable material comprises a thermite, a metal-oxidizer, a metal hydride-oxidizer, an intermetallic, or a pyrotechnic composition.

16. The apparatus of claim 14, wherein the fusible element comprises an electro-pyrotechnic initiator, a bridge wire, a nichrome wire, or a heating element.

17. The apparatus of claim 14,
   wherein the fusible element comprises a composite of the ignitable material and the fusible material; or
   wherein the ignitable material comprises a core of the fusible element, and the fusible material is disposed as a portion of the jacket of the fusible element about the core.

18. The apparatus of claim 10, wherein the fusible material comprises a metallic weld material, a metallic braze material, a metallic solder material, a metallic alloy, or a metallurgical bonding material.

19. The apparatus of claim 10, further comprising a tool comprising electrodes coupled to a source of electric current, the electrodes engageable with the fusible element via the at least one access point and applying the electric current to the fusible element as the electric activation.

20. The apparatus of claim 10, wherein the collar comprises:
   a cylindrical sleeve being configured to slide onto or into the tubing;
   a split sleeve having a longitudinal split therein and being configured to wrap about the tubing; or
   a hinged sleeve having a longitudinal split and at least one hinge and being configured to close about the tubing.

* * * * *